United States Patent [19]
Berst et al.

[11] 3,971,413
[45] July 27, 1976

[54] DAMPER ARRANGEMENT

[75] Inventors: Albert H. Berst, Louisville, Ky.;
Robert Wright, Houston, Tex.;
Wilson E. Kelley, Jr., Pleasure
Ridge Park, Ky.

[73] Assignee: American Air Filter Company, Inc.,
Louisville, Ky.

[22] Filed: Mar. 4, 1975

[21] Appl. No.: 555,153

[52] U.S. Cl. .......................................... 137/630.14
[51] Int. Cl.² ........................................... F16K 1/54
[58] Field of Search ................... 137/630.14, 630.15

[56] References Cited
UNITED STATES PATENTS

| | | | |
|---|---|---|---|
| 1,655,729 | 1/1928 | Jones | 137/630.14 |
| 3,196,699 | 7/1965 | Ipsen | 137/630.14 X |
| 3,428,090 | 2/1969 | Hose et al. | 137/630.14 |

*Primary Examiner*—Robert G. Nilson

[57] ABSTRACT

A damper arrangement wherein a damper blade opens and closes a flow through orifice in a plate in response to actuating means for moving the blade relative to the orifice, the damper blade including an opening therein in communication with the orifice, the actuating means cooperating with a vent means to provide venting through the plate by way of the opening prior to moving the blade relative to the orifice.

6 Claims, 3 Drawing Figures

DAMPER ARRANGEMENT

BACKGROUND OF THE INVENTION

This invention relates to a damper arrangement and in particular relates to a damper blade and means to selectively control the opening and closing of a flow through orifice to provide a selectively buffered transition in a system when starting or stopping fluid flow.

It is desirable to provide for a buffered transition when removing a fluid system from or returning a fluid system to full fluid flow. For example, in the filtering of a gas stream using cloth fabric bags, it is desirable to avoid a sudden surge of fluid when a fluid controlling damper arrangement is activated since sudden surges of fluid may cause the fabric filter bag to snap and consequently weaken the fabric material and cause other undesirable results. This weakening of the fabric is particularly noticeable when the fabric material contains glass fibers or components therein. The prior art damper arrangements, such as bullseye dampers and butterfly dampers, can only be made to function satisfactorily in controlling sudden surges of fluid by using an expensive time actuating means which causes them to operate very slowly. Even then, butterfly dampers are particularly difficult to use because the fluid flow rate does not change linearly with respect to the change of position of the damper blade, but rather most of the fluid control occurs when the damper blade is merely parallel to the direction of fluid flow. Less objectionable is the bullseye damper since its flow rate changes linearly over the entire damper blade stroke.

SUMMARY OF THE INVENTION

In the present invention, it is recognized that it is desirable to provide a damper arrangement which is straightforward, inexpensive, readily constructed, and provides a buffered transition for removing a fluid system from or returning a fluid system to full fluid flow.

The present arrangement advantageously provides a straightforward arrangement for a damper arrangement which includes means to control the opening and closing of a flow through orifice. The present invention further provides a damper control arrangement which is inexpensive, sturdy, easy and quickly operable, and yet effective during operating conditions. The present invention even further provides a damper arrangement which is useful, for example, for the gentle inflation of a gas filter bag as it is being put on stream.

Various other features of the present invention will become obvious to those skilled in the art upon reading the disclosure set forth hereinafter.

More particularly, the present invention provides a damper arrangement comprising:

a. a plate having an orifice located therein;
b. an orifice closing blade movably positioned between an open position and a closed position in relation to the orifice, the blade having an opening therein of relatively small diameter in relation to the plate orifice, the opening being in flow through communication with the plate orifice; and,
c. actuating means for moving the blade relative to the plate, the actuating means being in cooperation with a vent means, the vent means being in flow through communication with the opening upon acutation of the actuating means, the flow through communication being established prior to actuating means moving the blade from its closed position.

It is to be understood that the description of the examples of the present invention given hereinafter are not by way of limitation and various modifications within the scope of the present invention will occur to those skilled in the art upon reading the disclosure set forth hereinafter.

Referring to the drawing.

Figure 1:
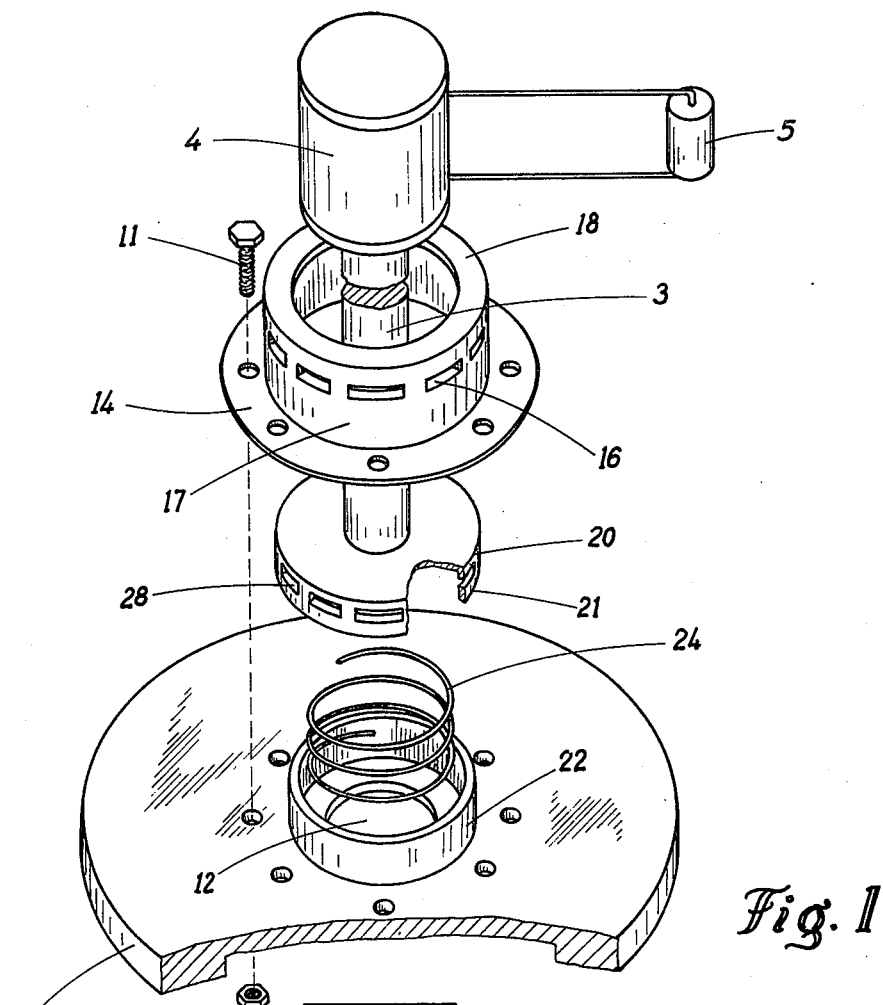
FIG. 1 is an exploded view, in perspective, with selected portions cut-away, of one preferred embodiment of the damper assembly of the present invention.

The Figures of the drawing illustrate the structure of a damper assembly 2 operable in response to the operation of an actuating means for moving an orifice closing blade or damper blade 6, the actuating means being exemplified as a piston 20 connected to shaft 3 which extends through wall 7 and is attached to a fluid cylinder 4, the fluid being generally either hydraulic or pneumatic, the fluid pressures for operation of the fluid cylinder 4 being supplied from any known source. However, it is realized that the means for moving the piston 20 may be other means, such as a motorized drive with appropriate gearing. The fluid cylinder 4 is supported by frame 9 and is operable in response to a control means 5, control means 5 being generally a simple switch arrangement supplying power to actuate fluid cylinder 4 or other drive means for driving piston 20.

Figure 2:
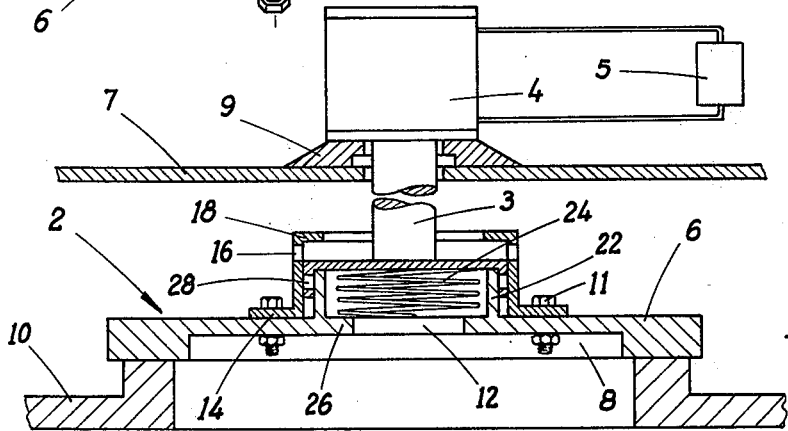
FIG. 2 is an elevational view, partially in cross section, of the damper assembly of FIG. 1 with the damper being in a closed position.
Figure 3:
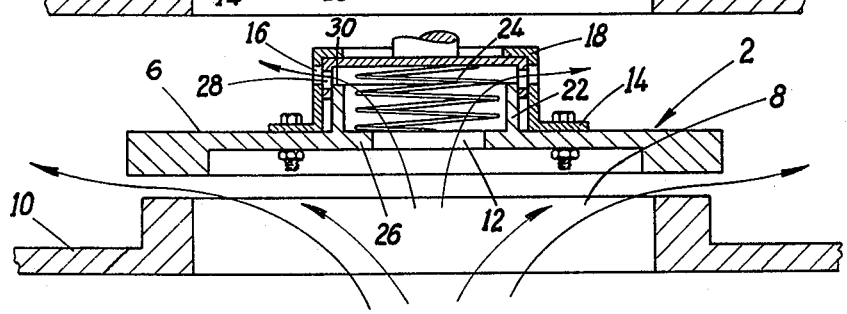
FIG. 3 is an elevational view, partially in cross-section, of the damper assembly of FIG. 1 with the damper being in an open position.

The damper assembly of the present invention includes the damper blade 6 which when actuated to a closed position forms a substantially fluid tight seal with an orifice 8 disposed within plate 10. The damper blade 6 is movably positioned between an open position, as shown in FIG. 3 and a closed position, as shown in FIG. 2 in relation to the orifice 8. The damper blade 6 is provided with an opening 12 substantially in the center thereof with vent means in communication therewith, the vent means including a housing 14 circumferentially surrounding the opening 12, the housing 14 being mounted onto the blade 6 by bolt means 11. The housing 14 including walls 17 is provided with flow through apertures 16 in the walls 17 thereof and engaging means, exemplified as an inwardly extending flange portion 18, the flange 18 being spaced a preselected distance from the blade 16.

The housing 14 receives the piston 20 therein and the flange portion 18 is adapted for engagement with the piston 20 when the piston 20 is in movement away from the opening 12. Further retracting movement of the piston 20 causes abutment against engaging means 10 to lift the housing 14 and in turn the blade 6 away from the orifice 8 thereby providing a flow through opening in the plate 10.

The piston 20 may be a soft resilient material and is provided with an outwardly extending wall portion 21, the wall portion 21 defining a recess in the piston 20.

Disposed within the housing 14 is a guide member or collar 22 circumferentially surrounding the opening 12, collar 22 being attached to the blade 6. The collar 22 has an outer diameter substantially the same as the inner diameter of the wall portion 21 of piston 20 and receives and guides the piston 20 in a fluid tight relation when the piston is in a closed or first position. Disposed within the collar 22 is a resilient spring means 24, the spring means 24 being disposed to rest on an inwardly extending ledge 26 of plate 6 surrounding orifice 12 adjacent collar 22. The spring means 24 under compression from piston 20 forces damper blade 6 into closed position.

The piston 20 is movably mounted to slide along the inner face of wall 17 of the housing 14 and is further provided with radially extending apertures 28 in the walls 21 thereof, the apertures 28 being in fluid communication with the recess and in alignment with apertures 16 in housing 14 when the piston 20 moves a preselected distance from its first position to its second position whereby fluid flows from the opening 12 in the blade 6 through the apertures 28 and out through apertures 16.

In the operation of the damper assembly described previously, when the damper blade 6 is in a closed position, piston 20 rests upon the shoulders of the collar 22 compressing spring means 24 against the damper blade 6 thereby providing a fluid tight seal or closing of the orifice 8. Upon actuation of the fluid cylinder 4 by means of the control means 5, piston 20 retracts and engages with the flange portion 18 of the housing 14. Just prior to engagement with the flange portion 18, apertures 28 are in alignment with apertures 16 thereby allowing for the flow of gases through the orifice 8 and subsequently out through apertures 28 and 16. Upon engagement with flange portion 18 and further retraction of the piston 20, the damper blade 6 is lifted away from the closed position with the plate 10 since the housing 14 including flange 18 is attached to the damper blade 6. Flow of the gases through the orifice 8 and out through the apertures 28 and 16 provides a buffer for a smooth transition from no flow to full flow through orifice 8.

It is realized that cleaning means (not shown) may also be provided for cleaning apertures 16 and 28 as well as the spring means 24 when dust build up occurs.

It is also realized that various changes may be made to the specific embodiment shown and described without departing from the scope and principals of the present invention.

What is claimed is:

1. A damper arrangement comprising:
   a. a plate having an orifice located therein;
   b. an orifice closing blade movably positioned between an open position and a closed position in relation to said orifice, said blade having an opening therein of relatively small diameter in relation to said plate orifice, said opening being in flow-through communication with said plate orifice; and,
   c. actuating means for moving said blade relative to said plate, said actuating means being in cooperation with a vent means, said vent means being in flow through communication with said opening upon actuation of said actuating means, said actuating means including a movably mounted piston with flow through apertures therein, said piston covering said opening in a fluid tight communication in one position and in fluid communication with said vent means in a second position, said vent means including a housing attached to said blade and surrounding said opening therein, said housing receiving said piston therein, said housing having flow through apertures therein in fluid communication with said flow through apertures in said piston when said piston is in said second position, said flow through communication being established prior to actuating means moving said blade from its closed position.

2. The damper arrangement of claim 1, said housing having piston engaging means thereon, said engaging means being spaced a preselected distance from said blade, said piston engaging said engaging means in said second position.

3. The damper arrangement of claim 4 wherein said piston engaging means is an inwardly extending flange portion.

4. The damper arrangement of claim 1, said blade having an outwardly extending guide member surrounding said opening, said guide member receiving said piston, said guide member cooperating with said piston to provide a fluid tight communication with said opening in said first position.

5. The damper arrangement of claim 4, said guide member having an inwardly extending ledge surrounding said opening, said ledge receiving compression means thereon, said compression means cooperating with said piston to provide a fluid tight communication with said opening.

6. The damper arrangement of claim 5, said piston being slidably mounted along the inner walls of said housing, said piston having outwardly extending walls defining a recess therein, said recess receiving said guide member therein, said piston having said flow through apertures of said piston in said walls thereof.

* * * * *